United States Patent
Wan et al.

(10) Patent No.: US 11,392,761 B2
(45) Date of Patent: Jul. 19, 2022

(54) METHOD AND APPARATUS FOR DISPLAYING TABLE INFORMATION, AND ELECTRONIC DEVICE AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventors: Shiqi Wan, Beijing (CN); Xinxin Zhang, Beijing (CN)

(73) Assignee: BEIJING BYTEDANCE NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/544,567

(22) Filed: Dec. 7, 2021

(65) Prior Publication Data

US 2022/0092258 A1    Mar. 24, 2022

Related U.S. Application Data

(63) Continuation of application No. PCT/CN2020/128166, filed on Nov. 11, 2020.

(30) Foreign Application Priority Data

Jan. 19, 2020  (CN) .......................... 202010060461.3

(51) Int. Cl.
*G06F 40/00* (2020.01)
*G06F 40/18* (2020.01)
*G06F 40/106* (2020.01)

(52) U.S. Cl.
CPC ............ *G06F 40/18* (2020.01); *G06F 40/106* (2020.01)

(58) Field of Classification Search
CPC .............................. G06F 40/18; G06F 40/106
See application file for complete search history.

(56) References Cited

U.S. PATENT DOCUMENTS 7,143,339 B2 * 11/2006 Weinberg ................ G06F 16/30
                                                                 715/212
9,880,991 B2 *  1/2018 Kelley .................. G06F 40/177
(Continued)

FOREIGN PATENT DOCUMENTS

AU       2018201413 A1    3/2018
CN        109491574 A     3/2019
(Continued)

OTHER PUBLICATIONS

Unknown Author (1992) "Analysis and design of accounting statement management system" Metallurgical Industry Automation, vol. 16, No. 1, pp. 39-64 (with English Abstract).
(Continued)

*Primary Examiner* — Scott T Baderman
*Assistant Examiner* — Barbara M Level
(74) *Attorney, Agent, or Firm* — Faegre Drinker Biddle & Reath LLP

(57) ABSTRACT

Provided are a method and apparatus for displaying table information, an electronic device and a non-transitory computer-readable storage medium. The method for displaying table information includes: acquiring a row information display instruction of a target table, where the row information display instruction includes information of a target content row; and displaying, in a portrait orientation, first information in a header row of the target table and second information in the target content row according to the row
(Continued)

|   | A | B | C | D |
|---|---|---|---|---|
| 1 | Candidate | Serial number | Sex | Contact |
| 2 | XXX | 001 | Female | 130229 |
| 3 | XXX | 002 | Male | 130225 | information display instruction, where a cell in which the first information is located and a cell in which the second information is located have a same column identifier.

19 Claims, 6 Drawing Sheets

(56) References Cited

U.S. PATENT DOCUMENTS

| | | | |
|---|---|---|---|
| 10,140,279 B2 | 11/2018 | Zia et al. | |
| 2004/0255244 A1* | 12/2004 | Filner | G06F 40/103 715/239 |
| 2011/0029852 A1* | 2/2011 | Naibo | G06F 40/18 715/212 |
| 2011/0289398 A1* | 11/2011 | Chin | G06F 40/18 715/227 |
| 2013/0110884 A1* | 5/2013 | Eakins | G06F 40/18 707/809 |
| 2015/0007010 A1* | 1/2015 | Byron | G06F 40/20 715/227 |
| 2016/0124931 A1 | 5/2016 | Fan et al. | |
| 2017/0199861 A1* | 7/2017 | Zia | G06F 3/04842 |
| 2017/0315683 A1* | 11/2017 | Boucher | G06F 16/2228 |
| 2018/0067976 A1* | 3/2018 | Schoppe | G06F 40/18 |
| 2019/0034401 A1 | 1/2019 | Folting | |

FOREIGN PATENT DOCUMENTS

| | | | |
|---|---|---|---|
| CN | 109543162 A | | 3/2019 |
| CN | 109710771 A | | 5/2019 |
| CN | 109726380 A | * | 5/2019 |
| CN | 109726380 A | | 5/2019 |
| CN | 111241796 A | | 6/2020 |

OTHER PUBLICATIONS

Chinese Patent Application No. 202010060461.3, First Search Report.
International Patent Application No. PCT/CN2020/128166, International Search Report dated Dec. 30, 2020, 4 pages with English Translation.
Chinese Patent Application No. 202010060461.3, First Office Action dated Sep. 24, 2020, 16 pages with English Translation.
Chinese Patent Application No. 202010060461.3, Supplemental Search Report.

* cited by examiner

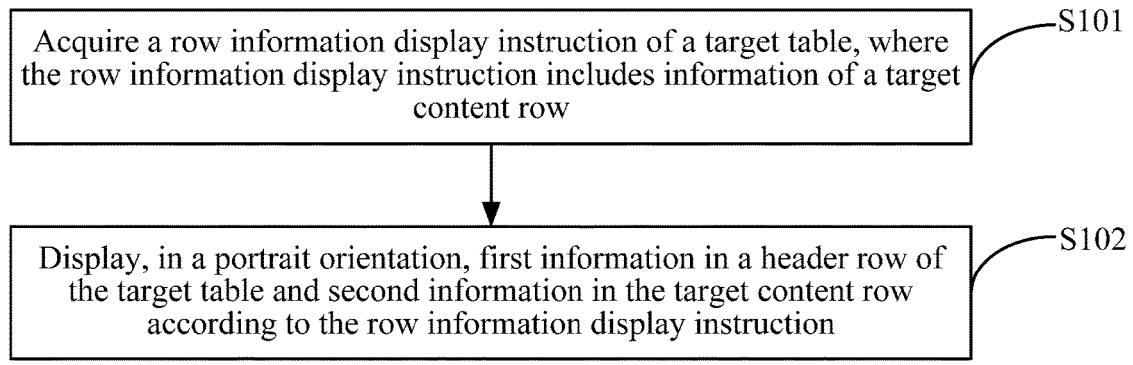

```
       ┌─────────────────────────────────────────────────────────────┐
       │ Acquire a row information display instruction of a target    │─S101
       │ table, where the row information display instruction includes│
       │ information of a target content row                          │
       └─────────────────────────────────────────────────────────────┘
                                    │
                                    ▼
       ┌─────────────────────────────────────────────────────────────┐
       │ Display, in a portrait orientation, first information in a   │─S102
       │ header row of the target table and second information in the │
       │ target content row according to the row information display  │
       │ instruction                                                  │
       └─────────────────────────────────────────────────────────────┘
```

FIG. 1

|   | A | B | C | D |
|---|---|---|---|---|
| 1 | Candidate | Serial number | Sex | Contact |
| 2 | XXX | 001 | Female | 130229 |
| 3 | XXX | 002 | Male | 130225 |

FIG. 2

| |
|---|
| Candidate |
| XXX |
| Serial number |
| 002 |
| Sex |
| Male |
| Contact |
| 130225 |

FIG. 3

When it is determined that a first setting is turned on for first n rows of the target table, select a row without a merged cell from the first n rows as a first target row — S201

Acquire the number of valid columns included in the first target row, where a valid column is a column in which a cell containing content is located — S202

Compare the number of valid columns included in the first target row with the number of valid columns included in a reference row — S203

Determine the first target row as the header row of the target table when the number of valid columns included in the first target row is greater than or equal to the number of valid columns included in the reference row — S204

FIG. 4

METHOD AND APPARATUS FOR DISPLAYING TABLE INFORMATION, AND ELECTRONIC DEVICE AND NON-TRANSITORY COMPUTER-READABLE STORAGE MEDIUM

CROSS REFERENCE TO RELATED APPLICATIONS

This is a continuation of International Patent Application No. PCT/CN2020/128166, filed on Nov. 11, 2020, which is based on and claims priority to Chinese Patent Application No. 202010060461.3 filed with the CNIPA on Jan. 19, 2020, the disclosures of which are incorporated herein by reference in their entireties.

TECHNICAL FIELD

The present disclosure relates to table information display techniques such as a method and apparatus for displaying table information, an electronic device and a non-transitory computer-readable storage medium.

BACKGROUND

Spreadsheets are indispensable tools for processing data in people's daily work. As people's needs change, online spreadsheets are widely used in the market because online spreadsheets can support multi-person collaboration and save editing results in the cloud in real time.

Taking an online spreadsheet as an example, a variety of data are generally displayed directly in a table region in the online spreadsheet in terms of information display. However, when the online spreadsheet has more data, the display content of the user equipment is limited, resulting in lower efficiency in viewing the data by the user.

SUMMARY

The present disclosure provides a method and apparatus for displaying table information, an electronic device and a non-transitory computer-readable storage medium so as to solve the problem of lower efficiency in viewing the data by the user in the related art.

A method for displaying table information is provided and includes the steps described below.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

An electronic device is further provided and includes a memory and a processor. The memory is configured to store a computer program. The processor is configured to, when executing the computer program, implement the steps described below.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

A non-transitory computer-readable storage medium is further provided and is configured to store a computer program, where the computer program, when executed by a processor, implements the steps below.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

BRIEF DESCRIPTION OF DRAWINGS

FIG. 1 is a flowchart of a method for displaying table information according to an embodiment of the present disclosure;

FIG. 2 is a schematic diagram of a target table according to an embodiment of the present disclosure;

FIG. 3 is a schematic diagram in which information in a target content row is displayed in a portrait orientation according to an embodiment of the present disclosure;

FIG. 4 is a flowchart of a method for displaying table information according to another embodiment of the present disclosure;

DETAILED DESCRIPTION

Figure 5:
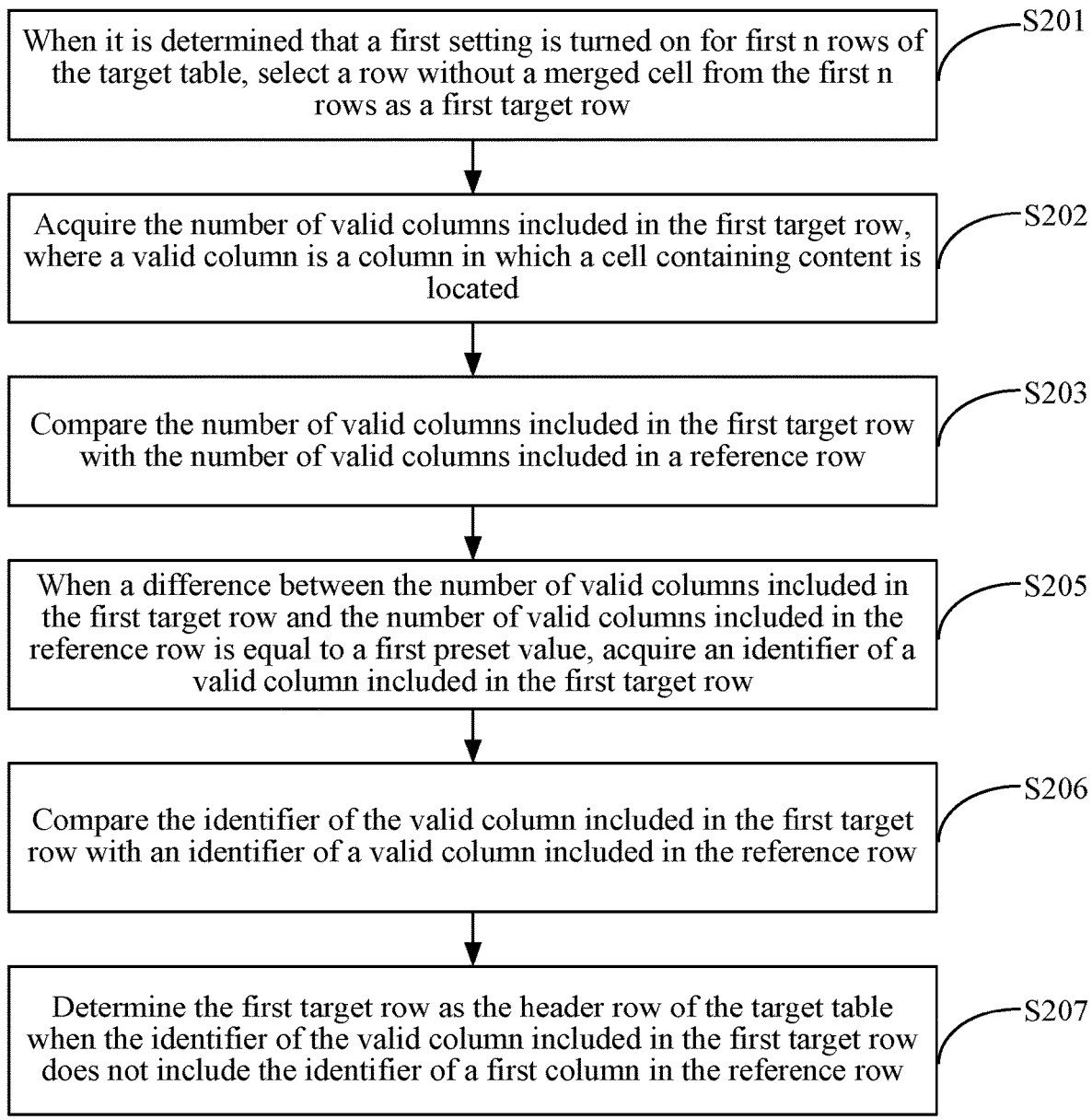
FIG. 5 is a flowchart of a method for displaying table information according to another embodiment of the present disclosure.

Embodiments of the present disclosure will be described below with reference to the drawings. The drawings illustrate some embodiments of the present disclosure, but it should be understood that the present disclosure may be implemented in various manners and should not be limited to the embodiments set forth herein. The drawings and embodiments of the present disclosure are merely for illustrative purposes and are not intended to limit the scope of the present disclosure.

The various steps recited in the method implementations of the present disclosure may be performed in a different order and/or in parallel. In addition, the method implementations may include additional steps and/or omit execution of illustrated steps. The scope of the present disclosure is not limited in this respect.

As used herein, the term "comprise" and variations thereof are intended to be inclusive, that is, "including, but not limited to". The term "based on" is "at least partially based on". The term "an embodiment" refers to "at least one embodiment"; the term "another embodiment" refers to "at least one another embodiment"; the term "some embodiments" refers to "at least some embodiments". Related definitions of other terms will be given in the description below.

Concepts such as "first" and "second" in the present disclosure are merely intended to distinguish one from another apparatus, module, or unit and are not intended to limit the order or interdependency of the functions performed by the apparatus, module, or unit. "One" and "a plurality" mentioned in the present disclosure are illustrative, are not intended to limit the present disclosure, and should be understood as "one or more" unless clearly expressed in the context.

The names of messages or information exchanged between a plurality of apparatuses in the implementations of the present disclosure are only for illustrative purposes and are not intended to limit the scope of such messages or information.

The execution subject may be an apparatus for displaying table information in the method embodiment described below, and the apparatus may be implemented as part or all of the electronic device by means of software, hardware, or a combination of software and hardware. The method embodiment below is illustrated by using an example in which the execution subject is the electronic device.

FIG. 1 is a flowchart of a method for displaying table information according to an embodiment. This embodiment relates to a process of how the electronic device displays row information in a target table. As shown in FIG. 1, the method includes steps S101 to S102.

In step S101, a row information display instruction of a target table is acquired, where the row information display instruction includes information of a target content row.

In an embodiment, the target content row is a content row in which information needs to be displayed and is a non-header row in the target table. The information of the target content row may include a column identifier of a cell in the target content row and information in the cell. The type of the information in the cell may be a character, a numerical value, a picture, a link address or the like, and the information in the cell acquired by the electronic device may further include a format of the information such as a font type (such as bold, underline, strikethrough, font color or background color).

When a user clicks on any content row in the target table, the electronic device uses such content row as a target content row and obtains a row information display instruction of the target content row. The user may also directly input identifiers of one or more target content rows in which information needs to be displayed so that the electronic device obtains row information display instructions of the one or more target content rows.

In step S102, first information in a header row of the target table and second information in the target content row are displayed in a portrait orientation according to the row information display instruction. The cell in which the first information is located and the cell in which the second information is located have the same column identifier.

In an embodiment, the example is used in which the column identifiers of the cells in the header row of the target table are A, B and C. After the row information display instruction of the target content row is obtained, the electronic device displays, in the portrait orientation, first information in the cell with column identifier A in the header row of the target table and second information in the cell with column identifier A in the target content row, displays, in the portrait orientation, first information in the cell with column identifier B in the header row of the target table and second information in the cell with column identifier B in the target content row, and displays, in the portrait orientation, first information in the cell with column identifier C in the header row of the target table and second information in the cell with column identifier C in the target content row.

When the first information and the second information fail to be completely displayed in the screen of the electronic device, the electronic device may display the undisplayed first information and the undisplayed second information according to the up-and-down sliding operation of the user.

In practical applications, in an embodiment, the electronic device may display, in the portrait orientation, on a card the first information in the cell in the header row of the target table and the second information in the cell having the same column identifier in the target content row. The width of the card may match the width of the screen of the electronic device, and the height of the card may be related to the amount of first information and the amount of second information displayed in the portrait orientation. When the first information and the second information are displayed in the portrait orientation, the first information and the second information which are displayed in the portrait orientation may remain in the original format of the first information and the original format of the second information. For example, the bold, the background color, underline and the like set for the first information may still be retained. When the second information is of a type of a picture and when the picture is displayed in the portrait orientation, the actual display ratio of the picture may be adjusted adaptively according to the screen size of the electronic device. In order to conform to the reading habits of the user, the first information and the second information may be displayed in the portrait orientation in the card in a left-justified manner.

In an embodiment, the electronic device merely needs to display the first information in the cell in the header row of the target table and the second information in the cell having the same column identifier in the target content row. The display form after the display in the portrait orientation may be set according to the actual application requirements, which is not limited in this embodiment.

The display process of the table information is illustrated by using the target table shown in FIG. 2 as an example. As shown in FIG. 2, the target table includes a header row and two content rows. The information in a plurality of cells in the header row (that is, header information) includes: "Candidate", "Serial number", "Name" and "Contact". Information in a plurality of cells having the same column identifiers as the cells in the header row in the first content row (that is, information corresponding to the header information) includes: "xxx", "001", "Male" and "130229". Information in a plurality of cells having the same column identifiers as the cells in the header row in the second content row (that is, information corresponding to the header information) includes: "xxx", "002", "Female" and "130225".

When the electronic device detects that the user clicks on the second content row, the electronic device may know that information in the second content row needs to be displayed and acquires the column identifiers of the plurality of cells in the second content row and information in the plurality of cells. The acquired information in the second content row is A—xxx (the information corresponding to column A is xxx), B—002 (the information corresponding to column B is 002), C—Female (the information corresponding to column C is Female), and D—130225 (the information corresponding to column D is 130225). Meanwhile, the correspondences between the column identifiers of the plurality of cells in the header row acquired by the electronic device and the information in the plurality of cells are A—Candidate, B—Serial number, C—Sex and D—Contact. The electronic device displays the information "Candidate" in the cell of column A in the header row and the information "xxx" in the cell of column A in the second content row in the portrait orientation, displays the information "Serial number" in the cell of column B in the header row and the information "002" in the cell of column B in the second content row in the portrait orientation, displays the information "Sex" in the cell of column C in the header row and the information "Female" in the cell of column C in the second content row in the portrait orientation, and displays the information "Contact" in the cell of column D in the header row and the information "130225" in the cell of column D in the second content row in the portrait orientation, thus obtaining the display form shown in FIG. 3.

According to the method for displaying table information provided by the embodiment of the present disclosure, after the row information display instruction of the target table is acquired, the electronic device displays, in the portrait orientation, the first information and the second information in the cells having the same column identifier in the header row and the target content row of the target table according to the row information display instruction. The electronic device displays, in the portrait orientation, the second information in the cell in the target content row of the target table and the first information in the corresponding cell in the header row. Therefore, when viewing the information in the cell of the target content row, for example, when viewing the information in the cell of the target content row that is not originally within the display range of the target table, the user can directly view the header row and the target content row of the target table simultaneously through the row information display instruction, thereby simplifying the operation of the user and improving the efficiency in viewing data.

In order to display row information in the target content row, on the basis of the preceding embodiment, in an embodiment, before step S101, the method further includes the following step: a header row of the target table is determined and the information of the header row is acquired.

In an embodiment, the information of the header row may include a column identifier of a cell in the header row and information in the cell. In an optional implementation, as shown in FIG. 4, the process in which the header row of the target table is determined may include steps S201 to S204.

In step S201, when it is determined that a first setting is turned on for first n rows of the target table, a row without a merged cell is selected from the first n rows as a first target row.

In an embodiment, n is a positive integer, and the first setting includes any one of background color, freezing or filtering. Generally, the user turns on the background color, freezing and filtering in the first two rows of the target table. In order to improve the processing performance of the electronic device, the value of n may be set with reference to the actual turning-on habit. In an embodiment, n may be set to 2.

In step S202, the number of valid columns included in the first target row is acquired, where a valid column is a column in which a cell containing content is located.

In step S203, the number of valid columns included in the first target row is compared with the number of valid columns included in a reference row.

In an embodiment, before step S203, the electronic device may select the reference row from all rows of the target table and acquire the number of valid columns included in the reference row. The electronic device may use the row having the largest row identifier among all rows of the target table as the reference row.

In step S204, the first target row is determined as the header row of the target table when the number of valid columns included in the first target row is greater than or equal to the number of valid columns included in the reference row.

In an embodiment, when the number of first target rows is greater than or equal to a second preset value and the number of valid columns included in each of the first target rows is greater than or equal to the number of valid columns included in the reference row, the step in which the first target row is determined as the header row of the target table includes the following steps: a first target row having the smallest row identifier is determined as the header row of the target table. Exemplarily, taking n equal to 2 as an example, when the electronic device determines that neither of the first two rows of the target table has a merged cell and that the number of valid columns included in each row is greater than or equal to the number of valid columns included in the reference row, the electronic device determines the first row as the header row of the target table.

When the number of valid columns included in the first target row is less than the number of valid columns included in the reference row, in an embodiment, steps S205 to S207 described below are further included after step S203 on the basis of the preceding embodiment, as shown in FIG. 5.

In step S205, when a difference between the number of valid columns included in the first target row and the number of valid columns included in the reference row is equal to a first preset value, identifiers of valid columns included in the first target row are acquired.

In step S206, the identifiers of the valid columns included in the first target row are compared with identifiers of valid columns included in the reference row.

In step S207, the first target row is determined as the header row of the target table when the identifiers of the valid columns included in the first target row do not include an identifier of a first column in the reference row.

In an embodiment, when the number of first target rows is greater than or equal to a second preset value, a difference between the number of valid columns included in each of the first target rows and the number of valid columns included in the reference row is equal to the first preset value, and the identifiers of the valid columns included in each of the first target rows do not include the identifier of the first column of the reference row (that is, when each of the first target rows includes merely no first valid column compared with the reference row), the step in which the first target row is determined as the header row of the target table includes the following steps: a first target row having the smallest row identifier is determined as the header row of the target table. Exemplarily, taking n equal to 2, the first preset value equal to 1 and the second preset value equal to 2 as an example, the electronic device determines the first row of the target table as the header row of the target table when the electronic device determines that each of the first two rows of the target table includes merely no first valid column compared with the reference row.

Figure 6:
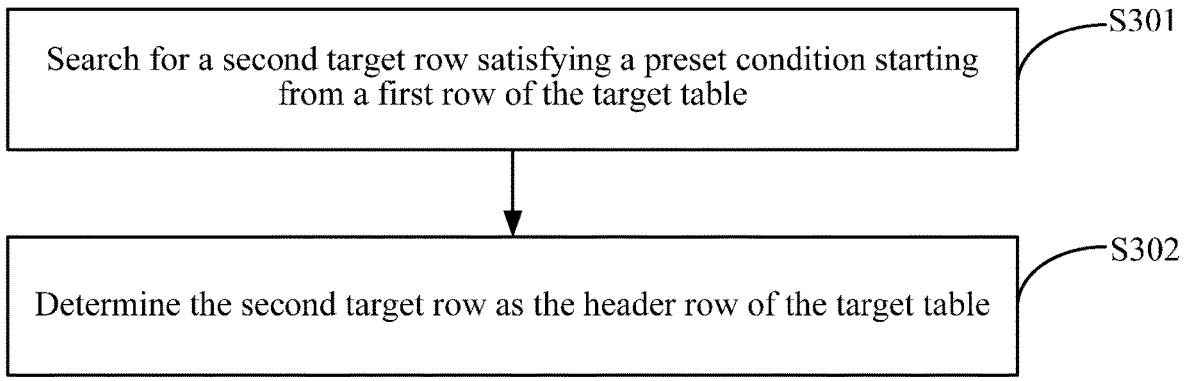
FIG. 6 is a flowchart of a method for displaying table information according to another embodiment of the present disclosure.

In another optional implementation, the process in which the header row of the target table is determined may include steps S301 to S302 as shown in FIG. 6.

In step S301, a second target row satisfying a preset condition is searched for starting from a first row of the target table.

In an embodiment, the preset condition is that no merged cell exists in a row and that the number of valid columns included in the row is greater than or equal to the number of valid columns included in a reference row; or the preset condition is that no merged cell exists in a row, that a difference between the number of valid columns included in the row and the number of valid columns included in a reference row is equal to a third preset value, and that identifiers of valid columns included in the row do not include an identifier of a first column of the reference row, where a valid column is a column in which a cell containing content is located.

The electronic device determines whether the first row satisfies the preset condition starting from the first row of the target table, and if yes, the first row is the second target row; if not, it is determined whether the next row of the first row satisfies the preset condition until the second target row satisfying the preset condition is found.

In step S302, the second target row is determined as the header row of the target table.

In this embodiment, the electronic device may determine the header row from all rows of the target table by a plurality of determination conditions such as whether the target table has been subjected to the first setting, the number of valid columns in the reference row, the identifiers of the valid columns in the reference row and whether a merged cell exists in the rows of the target table. In this manner, the accuracy of the header row determined based on the plurality of determination conditions is high, thereby ensuring the accuracy of the subsequent display of the table information based on the header row.

Figure 7:
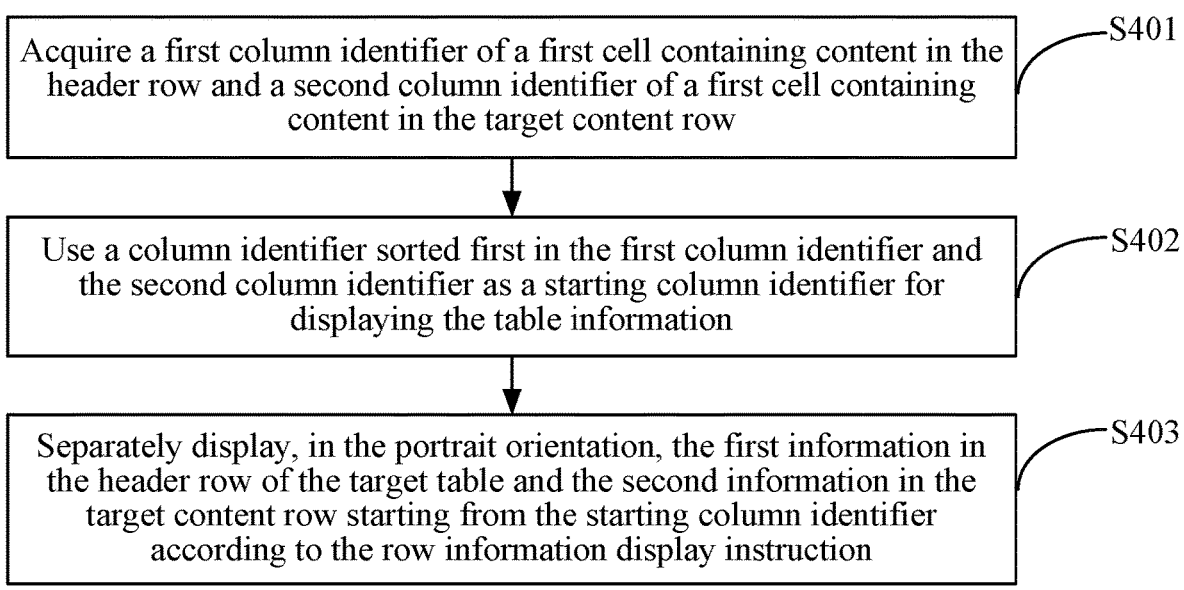
FIG. 7 is a flowchart of a method for displaying table information according to another embodiment of the present disclosure.

In practical applications, a case may exist where no content exists in the cell in the first column or the cells in first several columns of the header row or target content row of the target table. In order to avoid a large area of blank space in the interface after the information is displayed in the portrait orientation, the table information may be displayed with reference to the process shown in FIG. 7, and step S102 may include steps S401 to S403 as shown in FIG. 7.

In step S401, a first column identifier of a first cell containing content in the header row and a second column identifier of a first cell containing content in the target content row are acquired.

In step S402, a column identifier sorted first in the first column identifier and the second column identifier is used as a starting column identifier for displaying the table information.

In step S403, the first information in the header row of the target table and the second information in the target content row are separately displayed in the portrait orientation starting from the starting column identifier according to the row information display instruction. A cell in which the first information is located and a cell in which the second information is located have a same third column identifier, and the third column identifier ranges from the starting column identifier to a column identifier corresponding to a last cell containing content in the header row.

When the first information corresponding to the starting column identifier is empty and the first information corresponding to the starting column identifier and the second information corresponding to the starting column identifier are displayed in the portrait orientation, the starting column identifier is used as the first information, and the starting column identifier and the second information corresponding to the starting column identifier are displayed in the portrait orientation.

When the second information in a cell in the target content row that has the same column identifier as a cell in the header row is empty and when the first information and second information corresponding to such same column identifier are displayed in the portrait orientation, the first information is displayed and no content is displayed below the first information.

In this embodiment, the electronic device may determine the starting column identifier for displaying the table information according to the column identifier of the first cell containing content in the header row and the column identifier of the first cell containing content in the target content row in the target table and display the information in the header row and the information in the target content row from the starting column identifier in the portrait orientation, so that the information in the cells in the header row and the information in the cells the target content row are displayed in the screen of the electronic device as much as possible, and the user does not need to slide the scroll bar up and down to view the undisplayed information, improving the efficiency in viewing data. Meanwhile, no large area of blank space exists in the interface after the display in the portrait orientation, improving the aesthetics of a human-machine interface.

Figure 8:
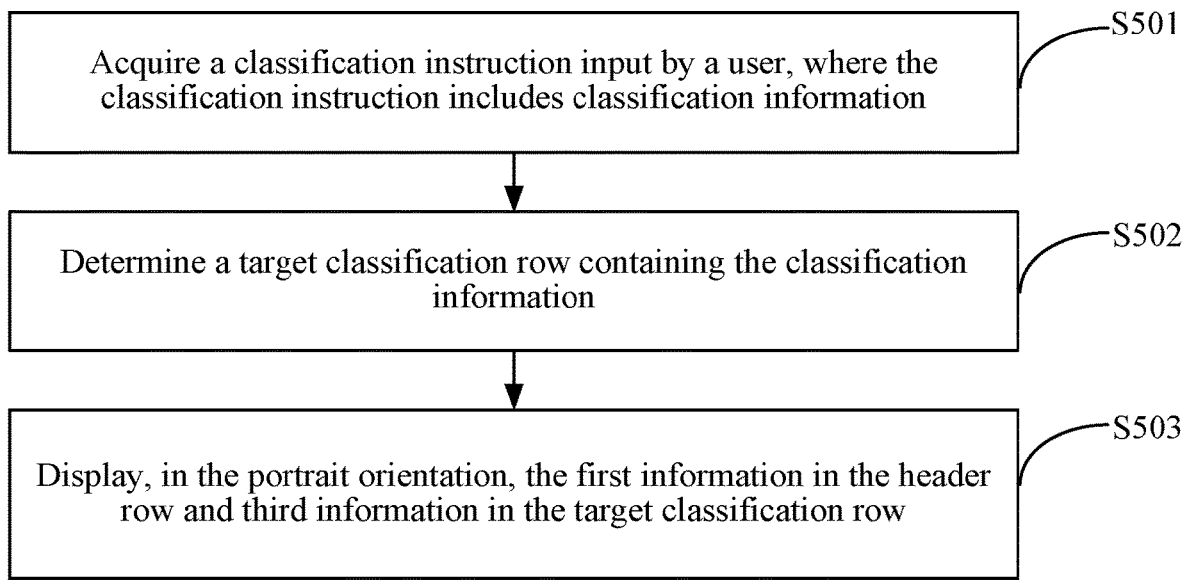
FIG. 8 is a flowchart of a method for displaying table information according to another embodiment of the present disclosure.

In practical applications, a huge amount of data exists in the target table, and the user merely desires to filter the data the user is interested in. For this reason, the electronic device may display the table information with reference to the process shown in FIG. 8. As shown in FIG. 8, the method further includes steps S501 to S503.

In step S501, a classification instruction input by a user is acquired, where the classification instruction includes classification information.

In an embodiment, the classification information is a filtering condition, which may be filtering by time (for example, today's update), name (associated with me) or the like.

In step S502, a target classification row containing the classification information is determined.

In an embodiment, a content row containing the classification information is selected from all the content rows of the target table, and the content row is used as a target classification row.

In step S503, the first information in the header row and third information in the target classification row are displayed in the portrait orientation. The cell in which the first information is located and the cell in which the third information is located have a same column identifier.

In an embodiment, for the process of displaying the first information and the third information in the portrait orientation in step S503, refer to the process of displaying the first information and the second information in the portrait orientation in the preceding embodiment. Details are not repeated in this embodiment.

On the basis of the preceding embodiment, in an embodiment, the method may further include the following steps: the electronic device acquires a folding instruction input by the user and modifies a state of target folding information from a display state to a hidden state, where the folding instruction includes the target folding information.

Similarly, the electronic device may also acquire an unfolding instruction input by the user and modify a state of target unfolding information from the hidden state to the display state according to the unfolding instruction, where the unfolding instruction includes the target unfolding information.

In this embodiment, the electronic device may display the information in the target classification row containing the classification information in the portrait orientation according to the classification instruction input by the user, may fold the second information displayed in the portrait orientation according to the folding instruction of the user, and may unfold the folded second information according to the unfolding instruction of the user, greatly enriching the human-machine interaction operation and improving the intelligence of the human-machine interaction.

Figure 9:
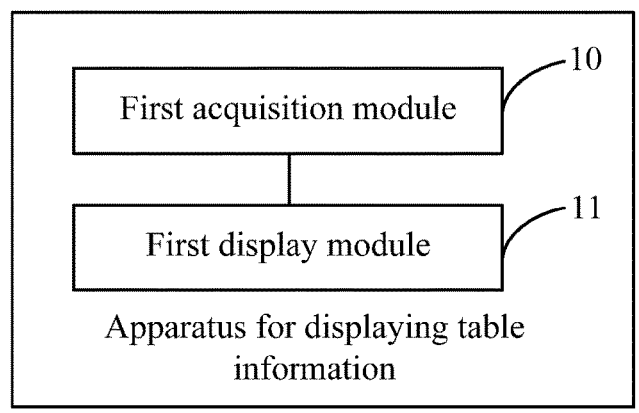
FIG. 9 is a schematic diagram showing an internal structure of an apparatus for displaying table information according to an embodiment of the present disclosure.

FIG. 9 is a schematic diagram showing an internal structure of an apparatus for displaying table information according to an embodiment. As shown in FIG. 9, the apparatus includes a first acquisition module 10 and a first display module 11.

In an embodiment, the first acquisition module 10 is configured to acquire a row information display instruction of a target table. The row information display instruction includes information of a target content row.

The first display module 11 is configured to display, in a portrait orientation, first information in a header row of the target table and second information in the target content row according to the row information display instruction. A cell in which the first information is located and a cell in which the second information is located have a same column identifier.

According to the apparatus for displaying table information provided by the embodiment of the present disclosure, after the row information display instruction of the target table is acquired, the electronic device displays, in the portrait orientation, the first information and the second information in the cells having the same column identifier in the header row and the target content row of the target table according to the row information display instruction. The electronic device displays, in the portrait orientation, the second information in the cell in the target content row of the target table and the first information in the corresponding cell in the header row. Therefore, when viewing the information in the cell of the target content row, for example, when viewing the information in the cell of the target content row that is not originally within the display range of the target table, the user can directly view the header row and the target content row of the target table simultaneously through the row information display instruction, thereby simplifying the operation of the user and improving the efficiency in viewing data.

On the basis of the preceding embodiment, in an embodiment, the apparatus further includes a first determination module and a second acquisition module.

The first determination module is configured to determine a header row of the target table before the first acquisition module 10 acquires the row information display instruction of the target table.

The second acquisition module is configured to acquire information of the header row.

On the basis of the preceding embodiment, in an embodiment, the first determination module includes a selection unit, a first acquisition unit, a comparison unit and a first determination unit.

The selection unit is configured to: when it is determined that a first setting is turned on for first n rows of the target table, select a row without a merged cell from the first n rows as a first target row, where n is a positive integer, and the first setting includes any one of background color, freezing or filtering.

The first acquisition unit is configured to acquire the number of valid columns included in the first target row. A valid column is a column in which a cell containing content is located.

The comparison unit is configured to compare the number of valid columns included in the first target row with the number of valid columns included in a reference row.

The first determination unit is configured to determine the first target row as the header row of the target table when the number of valid columns included in the first target row is greater than or equal to the number of valid columns included in the reference row.

On the basis of the preceding embodiment, in an embodiment, the first acquisition unit is further configured to: when a difference between the number of valid columns included in the first target row and the number of valid columns included in the reference row is equal to a first preset value, acquire identifiers of valid columns included in the first target row.

The comparison unit is further configured to compare the identifiers of the valid columns included in the first target row with identifiers of valid columns included in the reference row.

The first determination unit is further configured to determine the first target row as the header row of the target table when the identifiers of the valid columns included in the first target row do not include an identifier of a first column in the reference row.

On the basis of the preceding embodiment, in an embodiment, when the number of first target rows is greater than or equal to a second preset value and the number of valid columns included in each of the first target rows is greater than or equal to the number of valid columns included in the reference row, the first determination unit is configured to determine a first target row having the smallest row identifier as the header row of the target table.

On the basis of the preceding embodiment, in an embodiment, the first determination module is configured to search for a second target row satisfying a preset condition starting from a first row of the target table and determine the second target row as the header row of the target table. The preset condition is that no merged cell exists in a row and that the number of valid columns included in the row is greater than or equal to the number of valid columns included in a reference row; or the preset condition is that no merged cell exists in a row, that a difference between the number of valid columns included in the row and the number of valid columns included in a reference row is equal to a third preset value, and that identifiers of valid columns included in the row do not include an identifier of a first column of the reference row, where a valid column is a column in which a cell containing content is located.

On the basis of the preceding embodiment, in an embodiment, the first display module 11 includes a second acquisition unit, a second determination unit and a display unit.

The second acquisition unit is configured to acquire a first column identifier of a first cell containing content in the header row and a second column identifier of a first cell containing content in the target content row.

The second determination unit is configured to use a column identifier sorted first in the first column identifier and the second column identifier as a starting column identifier for displaying the table information.

The display unit is configured to separately display, in the portrait orientation, the first information in the header row of the target table and the second information in the target content row starting from the starting column identifier according to the row information display instruction. A cell in which the first information is located and a cell in which the second information is located have a same third column identifier, and the third column identifier ranges from the starting column identifier to a column identifier corresponding to a last cell containing content in the header row.

On the basis of the preceding embodiment, in an embodiment, when the first information corresponding to the starting column identifier is empty, the display unit is configured to use the starting column identifier as the first information and display the starting column identifier and the second information corresponding to the starting column identifier in the portrait orientation.

On the basis of the preceding embodiment, in an embodiment, when the second information is empty, the display unit is configured to display no content below the first information.

On the basis of the preceding embodiment, in an embodiment, the apparatus further includes a third acquisition module, a second determination module and a second display module.

The third acquisition module is configured to acquire a classification instruction input by a user. The classification instruction includes classification information.

The second determination module is configured to determine a target classification row containing the classification information.

The second display module is configured to display the first information in the header row and third information in the target classification row in the portrait orientation. The cell in which the first information is located and a cell in which the third information is located have a same column identifier.

On the basis of the preceding embodiment, in an embodiment, the apparatus further includes a fourth acquisition module and a modification module.

The fourth acquisition module is configured to acquire a folding instruction input by a user. The folding instruction includes target folding information.

The modification module is configured to modify a state of the target folding information from a display state to a hidden state.

Figure 10:
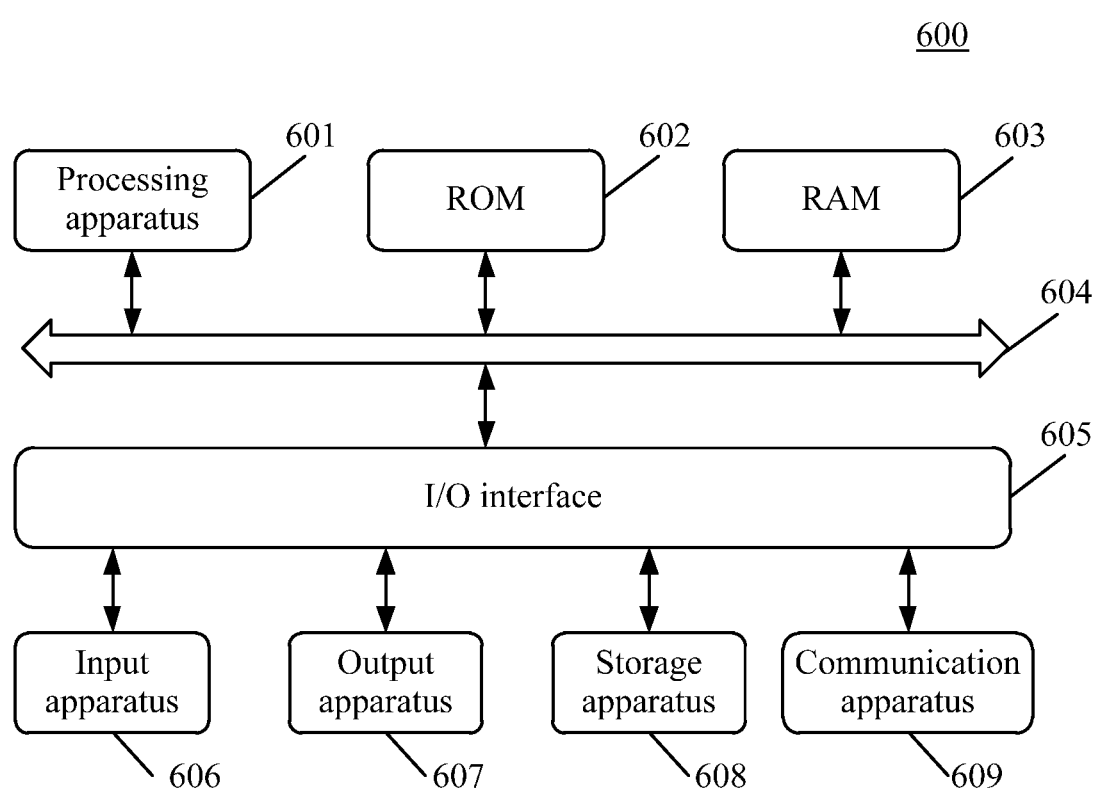
FIG. 10 is a schematic diagram showing an internal structure of an electronic device according to an embodiment of the present disclosure.

Referring to FIG. 10, FIG. 10 shows a structure diagram of an electronic device 600 suitable for implementing the embodiment of the present disclosure. The electronic device in the embodiment of the present disclosure may include mobile terminals such as a mobile phone, a laptop, a digital broadcast receiver, a personal digital assistant (PDA), a portable Android device (PAD), a personal multimedia player (PMP) and a vehicle-mounted terminal (for example, a vehicle-mounted navigation terminal) and fixed terminals such as a digital television (TV) and a desktop computer. The electronic device shown in FIG. 10 is merely an example and is not intended to limit the function and usage scope of the embodiments of the present disclosure.

As shown in FIG. 10, the electronic device 600 may include a processing apparatus 601 (such as a central processing unit or a graphics processor). The processing apparatus 601 may perform various appropriate actions and processing according to a program stored in a read-only memory (ROM) 602 or a program loaded into a random access memory (RAM) 603 from a storage apparatus 608. The RAM 603 also stores various programs and data required for the operation of the electronic device 600. The processing apparatus 601, the ROM 602, and the RAM 603 are connected to each other through a bus 604. An input/output (I/O) interface 605 is also connected to the bus 604.

The apparatus below may be connected to the I/O interface 605, including an input apparatus 606 such as a touch screen, a touch pad, a keyboard, a mouse, a camera, a microphone, an accelerometer and a gyroscope, an output apparatus 607 such as a liquid crystal display (LCD), a speaker and a vibrator, a storage apparatus 608 such as a magnetic tape and a hard disk, and a communication apparatus 609. The communication apparatus 609 may allow the electronic device 600 to perform wireless or wired communication with other devices so as to exchange data. FIG. 10 shows the electronic device 600 having various apparatuses, but it is not necessary to implement or be equipped with all the shown apparatuses. More or fewer apparatuses may be implemented instead.

According to the embodiment of the present disclosure, the process described above with reference to the flowchart may be implemented as a computer software program. For example, the embodiment of the present disclosure includes a computer program product. The computer program product includes a computer program carried in a non-transitory computer-readable medium. The computer program includes program codes for performing the method shown in the flowchart. In such an embodiment, the computer program may be downloaded from a network and installed through the communication apparatus 609, or may be installed from the storage apparatus 608, or may be installed from the ROM 602. When the computer program is executed by the processing apparatus 601, the preceding functions defined in the method of the embodiments of the present disclosure are performed.

The computer-readable medium described above in the present disclosure may be a computer-readable signal medium or a computer-readable storage medium or any combination thereof. The computer-readable storage medium may be an electrical, magnetic, optical, electromagnetic, infrared or semiconductor system, apparatus or device, or any combination thereof. The computer-readable storage medium may include: an electrical connection having one or more wires, a portable computer magnetic disk, a hard disk, an RAM, an ROM, an erasable programmable read-only memory (EPROM) or a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus or device. In the present disclosure, the computer-readable signal medium may include a data signal propagated on a baseband or as a part of a carrier, and computer-readable program codes are carried in the data signal. This propagated data signal may take a plurality of forms including an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including a wire, an optical cable, a radio frequency (RF), or any suitable combination thereof.

The computer-readable medium may be included in the electronic device or may exist alone without being assembled into the electronic device.

The preceding computer-readable medium carries one or more programs which, when executed by the electronic device, cause the electronic device to perform the following operations: acquiring a row information display instruction of a target table, where the row information display instruction includes information of a target content row; and displaying, in a portrait orientation, first information in a header row of the target table and second information in the target content row according to the row information display instruction, where a cell in which the first information is located and a cell in which the second information is located have a same column identifier.

Computer program codes for performing the operations of the present disclosure may be written in one or more programming languages or combination thereof, including object-oriented programming languages such as Java, Smalltalk, C++, as well as conventional procedural programming languages such as "C" or similar programming languages. The program codes may be executed entirely on a user computer, partly on the user computer, as a stand-alone software package, partly on the user computer and partly on a remote computer, or entirely on the remote computer or a server. In the case relating to the remote computer, the remote computer may be connected to the user computer via any type of network including a local area network (LAN) or a wide area network (WAN), or may be connected to an external computer (for example, via the Internet through an Internet service provider).

The flowcharts and block diagrams in the drawings show possible architectures, functions and operations of the system, method and computer program product according to a plurality of embodiments of the present disclosure. In this regard, each block in a flowchart or block diagram may represent a module, a program segment, or part of codes that contains one or more executable instructions for implementing specified logical functions. In some alternative implementations, the functions marked in the blocks may occur in an order different from that marked in the drawings. For example, two successive blocks may in fact be executed substantially in parallel or in a reverse order, which depends on the functions involved. Each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The names of the units do not constitute a limitation on the units themselves.

The functions described above herein may be performed, at least partially, by one or more hardware logic components. For example, without limitation, exemplary types of hardware logic components that may be used include: a field programmable gate array (FPGA), an application specific integrated circuit (ASIC), application specific standard parts (ASSP), a System-on-a-Chip (SOC), a complex programmable logic device (CPLD) and the like.

The apparatus for displaying table information, the device and the storage medium according to the preceding embodiments can execute the method for displaying table information according to any embodiment of the present disclosure and have function modules and beneficial effects corresponding to this method. For technical details not described in detail in the preceding embodiments, see the method for displaying table information provided in any embodiment of the present application.

According to one or more embodiments of the present disclosure, a method for displaying table information is provided. The method includes the steps described below.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

According to one or more embodiments of the present disclosure, the method for displaying table information is provided. The method further includes the following steps: a header row of the target table is determined and the information of the header row is acquired.

According to one or more embodiments of the present disclosure, the method for displaying table information is provided. The method further includes the following steps: when it is determined that a first setting is turned on for first n rows of the target table, a row without a merged cell from the first n rows as a first target row, where n is a positive integer, and the first setting includes any one of background color, freezing or filtering; the number of valid columns included in the first target row is acquired, where a valid column is a column in which a cell containing content is located; the number of valid columns included in the first target row is compared with the number of valid columns included in a reference row; and the first target row is determined as the header row of the target table when the number of valid columns included in the first target row is greater than or equal to the number of valid columns included in the reference row.

According to one or more embodiments of the present disclosure, the method for displaying table information is provided. The method further includes the following steps: when a difference between the number of valid columns included in the first target row and the number of valid columns included in the reference row is equal to a first preset value, identifiers of valid columns included in the first target row; the identifiers of the valid columns included in the first target row are compared with identifiers of valid columns included in the reference row; and the first target row is determined as the header row of the target table when the identifiers of the valid columns included in the first target row do not include an identifier of a first column in the reference row.

When the number of first target rows is greater than or equal to a second preset value and the number of valid columns included in each first target row is greater than or equal to the number of valid columns included in the reference row, the method for displaying table information provided according to one or more embodiments of the present disclosure further includes the following steps: a first target row having the smallest row identifier is determined as the header row of the target table.

According to one or more embodiments of the present disclosure, the method for displaying table information is provided. The method further includes the following steps: a second target row satisfying a preset condition is searched for starting from a first row of the target table and the second target row is determined as the header row of the target table. The preset condition is that no merged cell exists in a row and that the number of valid columns included in the row is greater than or equal to the number of valid columns included in a reference row; or the preset condition is that no merged cell exists in a row, that a difference between the number of valid columns included in the row and the number of valid columns included in a reference row is equal to a third preset value, and that identifiers of valid columns included in the row do not include an identifier of a first column of the reference row, where a valid column is a column in which a cell containing content is located.

According to one or more embodiments of the present disclosure, the method for displaying table information is provided. The method further includes the following steps: a first column identifier of a first cell containing content in the header row and a second column identifier of a first cell containing content in the target content row are acquired; a column identifier sorted first in the first column identifier and the second column identifier is used as a starting column identifier for displaying the table information; and separately displaying, in the portrait orientation, the first information in the header row of the target table and the second information in the target content row starting from the starting column identifier according to the row information display instruction, where a cell in which the first information is located and a cell in which the second information is located have a same third column identifier, and the third column identifier ranges from the starting column identifier to a column identifier corresponding to a last cell containing content in the header row.

When the first information corresponding to the starting column identifier is empty, the method for displaying table information provided according to one or more embodiments of the present disclosure further includes the following steps: the starting column identifier is used as the first information, and displaying the starting column identifier and second information corresponding to the starting column identifier in the portrait orientation.

When the second information is empty, the method for displaying table information provided according to one or more embodiments of the present disclosure further includes the following step: no content below the first information is displayed.

According to one or more embodiments of the present disclosure, the method for displaying table information is provided. The method further includes the following steps: a classification instruction input by a user is acquired, where the classification instruction includes classification information; a target classification row containing the classification information is determined; and displaying, in the portrait orientation, the first information in the header row and third information in the target classification row, where the cell in which the first information is located and a cell in which the third information is located have a same column identifier.

According to one or more embodiments of the present disclosure, the method for displaying table information is provided. The method further includes the following steps: a folding instruction input by a user is acquired, where the folding instruction includes target folding information; and a state of the target folding information is modified from a display state to a hidden state.

According to one or more embodiments of the present disclosure, an apparatus for displaying table information is provided. The apparatus includes a first acquisition module and a first display module.

The first acquisition module is configured to acquire a row information display instruction of a target table, where the row information display instruction includes information of a target content row.

The first display module is configured to display, in a portrait orientation, first information in a header row of the target table and second information in the target content row according to the row information display instruction, where a cell in which the first information is located and a cell in which the second information is located have a same column identifier.

According to one or more embodiments of the present disclosure, an electronic device is provided. The electronic device includes a memory and a processor. The memory stores a computer program. When executing the computer program, the processor implements the steps described below.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

According to one or more embodiments of the present disclosure, a computer-readable storage medium is provided and is configured to store a computer program. When a processor executes the computer program, the steps described below are implemented.

A row information display instruction of a target table is acquired, where the row information display instruction includes information of a target content row.

First information in a header row of the target table and second information in the target content row are displayed in a portrait orientation according to the row information display instruction, where a cell in which the first information is located and a cell in which the second information is located have a same column identifier.

In addition, although the operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Conversely, various features described in the context of a single embodiment may also be implemented in a plurality of embodiments, individually or in any suitable sub-combination.

What is claimed is:

1. A method for displaying table information, comprising:
 acquiring a row information display instruction of a target table, wherein the row information display instruction comprises information of a target content row; and
 displaying, in a portrait orientation, first information in a header row of the target table and second information in the target content row according to the row information display instruction, wherein a cell in which the first information is located and a cell in which the second information is located have a same column identifier;

wherein displaying, in the portrait orientation, the first information in the header row of the target table and the second information in the target content row according to the row information display instruction comprises:

acquiring a first column identifier of a first cell containing content in the header row and a second column identifier of a first cell containing content in the target content row, wherein the first column identifier is different from the second column identifier;

selecting one of the first column identifier and the second column identifier, whose value is smaller, as a starting column identifier for displaying the table information; and separately displaying, in the portrait orientation, the first information in the header row of the target table and the second information in the target content row starting from the starting column identifier according to the row information display instruction, wherein a cell in which the first information is located and a cell in which the second information is located have a same third column identifier, and the third column identifier ranges from the starting column identifier to a column identifier corresponding to a last cell containing content in the header row.

2. The method of claim 1, wherein before acquiring the row information display instruction of the target table, the method further comprises:

determining the header row of the target table, and acquiring information of the header row.

3. The method of claim 2, wherein determining the header row of the target table comprises:

in a case of determining that a first setting is turned on for first n rows of the target table, selecting a row without a merged cell from the first n rows as a first target row, wherein n is a positive integer, and the first setting comprises one of background color, freezing or filtering;

acquiring a number of valid columns comprised in the first target row, wherein a valid column is a column in which a cell containing content is located;

comparing the number of the valid columns comprised in the first target row with a number of valid columns comprised in a reference row; and determining the first target row as the header row of the target table in a case where the number of the valid columns comprised in the first target row is greater than or equal to the number of the valid columns comprised in the reference row.

4. The method of claim 3, further comprising:

in a case where a difference between the number of the valid columns comprised in the first target row and the number of the valid columns comprised in the reference row is equal to a first preset value, acquiring identifiers of the valid columns comprised in the first target row;

comparing the identifiers of the valid columns comprised in the first target row with identifiers of the valid columns comprised in the reference row; and determining the first target row as the header row of the target table in a case where the identifiers of the valid columns comprised in the first target row do not comprise an identifier of a first column in the reference row.

5. The method of claim 3, wherein in a case where a number of first target rows is greater than or equal to a second preset value and a number of valid columns comprised in each of the first target rows is greater than or equal to the number of the valid columns comprised in the reference row, determining the first target row as the header row of the target table comprises:

determining a first target row having a smallest row identifier as the header row of the target table.

6. The method of claim 2, wherein determining the header row of the target table comprises:

searching for a second target row satisfying a preset condition starting from a first row of the target table, wherein the preset condition is that no merged cell exists in a row and that a number of valid columns comprised in the row is greater than or equal to a number of valid columns comprised in a reference row; or the preset condition is that no merged cell exists in a row, that a difference between a number of valid columns comprised in the row and a number of valid columns comprised in a reference row is equal to a third preset value, and that identifiers of the valid columns comprised in the row do not comprise an identifier of a first column of the reference row, wherein a valid column is a column in which a cell containing content is located; and determining the second target row as the header row of the target table.

7. The method of claim 1, wherein in a case where first information corresponding to the starting column identifier is empty, displaying, in the portrait orientation, the first information in the header row of the target table and the second information in the target content row according to the row information display instruction comprises:

using the starting column identifier as the first information, and displaying, in the portrait orientation, the starting column identifier and second information corresponding to the starting column identifier.

8. The method of claim 1, wherein in a case where the second information is empty, displaying, in the portrait orientation, the first information in the header row of the target table and the second information in the target content row according to the row information display instruction comprises:

displaying no content below the first information.

9. The method of claim 1, further comprising:

acquiring a classification instruction input by a user, wherein the classification instruction comprises classification information;

determining a target classification row containing the classification information; and displaying, in the portrait orientation, the first information in the header row and third information in the target classification row, wherein the cell in which the first information is located and a cell in which the third information is located have a same column identifier.

10. The method of claim 1, further comprising:

acquiring a folding instruction input by a user, wherein the folding instruction comprises target folding information; and modifying a state of the target folding information from a display state to a hidden state.

11. An electronic device, comprising a memory and a processor, wherein the memory is configured to store a computer program, and the processor, when executing the computer program, is configured to implement the following steps:

acquiring a row information display instruction of a target table, wherein the row information display instruction comprises information of a target content row; and displaying, in a portrait orientation, first information in a header row of the target table and second information in the target content row according to the row information display instruction, wherein a cell in which the first information is located and a cell in which the second information is located have a same column identifier;

wherein displaying, in the portrait orientation, the first information in the header row of the target table and the second information in the target content row according to the row information display instruction comprises:

acquiring a first column identifier of a first cell containing content in the header row and a second column identifier of a first cell containing content in the target content row, wherein the first column identifier is different from the second column identifier;

selecting one of the first column identifier and the second column identifier, whose value is smaller, as a starting column identifier for displaying the table information; and separately displaying, in the portrait orientation, the first information in the header row of the target table and the second information in the target content row starting from the starting column identifier according to the row information display instruction, wherein a cell in which the first information is located and a cell in which the second information is located have a same third column identifier, and the third column identifier ranges from the starting column identifier to a column identifier corresponding to a last cell containing content in the header row.

12. The electronic device of claim 11, wherein before acquiring the row information display instruction of the target table, the processor is further configured to implement the following step:

determining the header row of the target table, and acquiring information of the header row.

13. The electronic device of claim 12, wherein determining the header row of the target table comprises:

in a case of determining that a first setting is turned on for first n rows of the target table, selecting a row without a merged cell from the first n rows as a first target row, wherein n is a positive integer, and the first setting comprises one of background color, freezing or filtering;

acquiring a number of valid columns comprised in the first target row, wherein a valid column is a column in which a cell containing content is located;

comparing the number of the valid columns comprised in the first target row with a number of valid columns comprised in a reference row; and determining the first target row as the header row of the target table in a case where the number of the valid columns comprised in the first target row is greater than or equal to the number of the valid columns comprised in the reference row.

14. The electronic device of claim 13, wherein the processor is further configured to implement the following steps:

in a case where a difference between the number of the valid columns comprised in the first target row and the number of the valid columns comprised in the reference row is equal to a first preset value, acquiring identifiers of the valid columns comprised in the first target row;

comparing the identifiers of the valid columns comprised in the first target row with identifiers of the valid columns comprised in the reference row; and determining the first target row as the header row of the target table in a case where the identifiers of the valid columns comprised in the first target row do not comprise an identifier of a first column in the reference row.

15. The electronic device of claim 13, wherein in a case where a number of first target rows is greater than or equal to a second preset value and a number of valid columns comprised in each of the first target rows is greater than or equal to the number of the valid columns comprised in the reference row, determining the first target row as the header row of the target table comprises:

determining a first target row having a smallest row identifier as the header row of the target table.

16. A non-transitory computer-readable storage medium storing a computer program, wherein the computer program, when executed by a processor, implements the following steps:

acquiring a row information display instruction of a target table, wherein the row information display instruction comprises information of a target content row; and displaying, in a portrait orientation, first information in a header row of the target table and second information in the target content row according to the row information display instruction, wherein a cell in which the first information is located and a cell in which the second information is located have a same column identifier;

wherein displaying, in the portrait orientation, the first information in the header row of the target table and the second information in the target content row according to the row information display instruction comprises:

acquiring a first column identifier of a first cell containing content in the header row and a second column identifier of a first cell containing content in the target content row, wherein the first column identifier is different from the second column identifier;

selecting one of the first column identifier and the second column identifier, whose value is smaller, as a starting column identifier for displaying the table information; and separately displaying, in the portrait orientation, the first information in the header row of the target table and the second information in the target content row starting from the starting column identifier according to the row information display instruction, wherein a cell in which the first information is located and a cell in which the second information is located have a same third column identifier, and the third column identifier ranges from the starting column identifier to a column identifier corresponding to a last cell containing content in the header row.

17. The non-transitory computer-readable storage medium of claim 16, wherein before acquiring the row information display instruction of the target table, the computer program, when executed by a processor, further implements the following step:

determining the header row of the target table, and acquiring information of the header row.

18. The non-transitory computer-readable storage medium of claim 17, wherein determining the header row of the target table comprises:

in a case of determining that a first setting is turned on for first n rows of the target table, selecting a row without a merged cell from the first n rows as a first target row, wherein n is a positive integer, and the first setting comprises one of background color, freezing or filtering;

acquiring a number of valid columns comprised in the first target row, wherein a valid column is a column in which a cell containing content is located;

comparing the number of the valid columns comprised in the first target row with a number of valid columns comprised in a reference row; and determining the first target row as the header row of the target table in a case where the number of the valid columns comprised in the first target row is greater than or equal to the number of the valid columns comprised in the reference row.

19. The non-transitory computer-readable storage medium of claim 18, wherein the computer program, when executed by a processor, further implements the following steps:

in a case where a difference between the number of the valid columns comprised in the first target row and the number of the valid columns comprised in the reference row is equal to a first preset value, acquiring identifiers of the valid columns comprised in the first target row;

comparing the identifiers of the valid columns comprised in the first target row with identifiers of the valid columns comprised in the reference row; and determining the first target row as the header row of the target table in a case where the identifiers of the valid columns comprised in the first target row do not comprise an identifier of a first column in the reference row.

* * * * *